US009854112B2

(12) United States Patent
Saito

(10) Patent No.: US 9,854,112 B2
(45) Date of Patent: Dec. 26, 2017

(54) INFORMATION DISPLAY APPARATUS, INFORMATION PROVIDING APPARATUS, AND COMMUNICATION SYSTEM

(71) Applicant: Ken Saito, Tokoname (JP)

(72) Inventor: Ken Saito, Tokoname (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 818 days.

(21) Appl. No.: 14/039,105

(22) Filed: Sep. 27, 2013

(65) Prior Publication Data
US 2014/0085677 A1 Mar. 27, 2014

(30) Foreign Application Priority Data

Sep. 27, 2012 (JP) ................. 2012-214208

(51) Int. Cl.
H04N 1/00 (2006.01)
H04N 7/173 (2011.01)
(Continued)

(52) U.S. Cl.
CPC ..... H04N 1/00408 (2013.01); H04N 1/00129 (2013.01); H04N 1/00482 (2013.01); H04N 2201/0094 (2013.01)

(58) Field of Classification Search
None
See application file for complete search history.

(56) References Cited

U.S. PATENT DOCUMENTS 6,981,034 B2* 12/2005 Ding ................ H04L 12/24
320/119
7,108,436 B2* 9/2006 Sawano ............ H04N 1/00347
379/100.05
(Continued)

FOREIGN PATENT DOCUMENTS

JP 2006-079353 A 3/2006
JP 2006-135602 A 5/2006
(Continued)

OTHER PUBLICATIONS

Hewlett Packard, Photosmart eStation Fact Sheet, available on Internet at http://www.hp.com/hpinfo/newsroom/press_kits/2010/InnovationSummit/HP_Photosmart_eStation_Ds.pdf, Oct. 12, 2010.

(Continued)

Primary Examiner — Alpus H Hsu
(74) Attorney, Agent, or Firm — Merchant & Gould P.C.

(57) ABSTRACT

A communication system includes an information display apparatus and an information providing apparatus which perform communication with each other. The information display apparatus transmits, through the network, an information transmission request for requesting transmission of specific information related to the information providing apparatus to a plurality of apparatuses connected to the network by broadcast communication, receives the specific information transmitted, through the network, from the information providing apparatus to a plurality of apparatuses connected to the network by broadcast communication, as a response to the information transmission request, and controls a display unit to display the specific information received as the response to the information transmission request.

8 Claims, 5 Drawing Sheets

(51) Int. Cl.
*H04L 12/28* (2006.01)
*G06F 15/16* (2006.01)

(56) References Cited

U.S. PATENT DOCUMENTS

| | | | | |
|---|---|---|---|---|
| 7,406,513 | B2* | 7/2008 | Furukawa | H04L 29/12009 709/220 |
| 8,125,664 | B2* | 2/2012 | Tomita | H04N 1/00204 358/1.13 |
| 8,166,149 | B2* | 4/2012 | Ishimoto | H04L 12/2424 709/220 |
| 8,180,900 | B2* | 5/2012 | Mousseau | H04L 29/06 709/227 |
| 8,295,268 | B2* | 10/2012 | Tanaka | H04L 29/06027 370/351 |
| 8,520,229 | B2* | 8/2013 | Kusakabe | H04N 1/00214 358/1.14 |
| 8,572,667 | B2* | 10/2013 | Kim | H04N 7/1675 725/100 |
| 8,694,650 | B2* | 4/2014 | Mousseau | H04L 29/06 709/219 |
| 8,730,510 | B2* | 5/2014 | Takano | H04N 1/00217 358/1.13 |
| 8,813,150 | B2* | 8/2014 | Tsunashima | H04N 21/43615 725/110 |
| 8,949,999 | B2* | 2/2015 | Boeckner | G06F 21/6218 726/17 |
| 8,984,061 | B2* | 3/2015 | Inoue | G06F 3/14 348/47 |
| 2006/0013179 | A1* | 1/2006 | Yamane | H04W 72/02 370/338 |
| 2006/0051149 | A1 | 3/2006 | Sawano | |
| 2008/0240740 | A1 | 10/2008 | Asano | |
| 2009/0083540 | A1* | 3/2009 | Kim | H04N 7/163 713/156 |
| 2011/0238800 | A1 | 9/2011 | Ishimoto | |
| 2012/0030526 | A1 | 2/2012 | Matsuda | |

FOREIGN PATENT DOCUMENTS

| | | |
|---|---|---|
| JP | 2008-252197 A | 10/2008 |
| JP | 2011-209889 A | 10/2011 |
| JP | 2012-030517 A | 2/2012 |

OTHER PUBLICATIONS

Office Action issued in related Japanese patent application No. 2012-214208, dated Aug. 23, 2016.

* cited by examiner

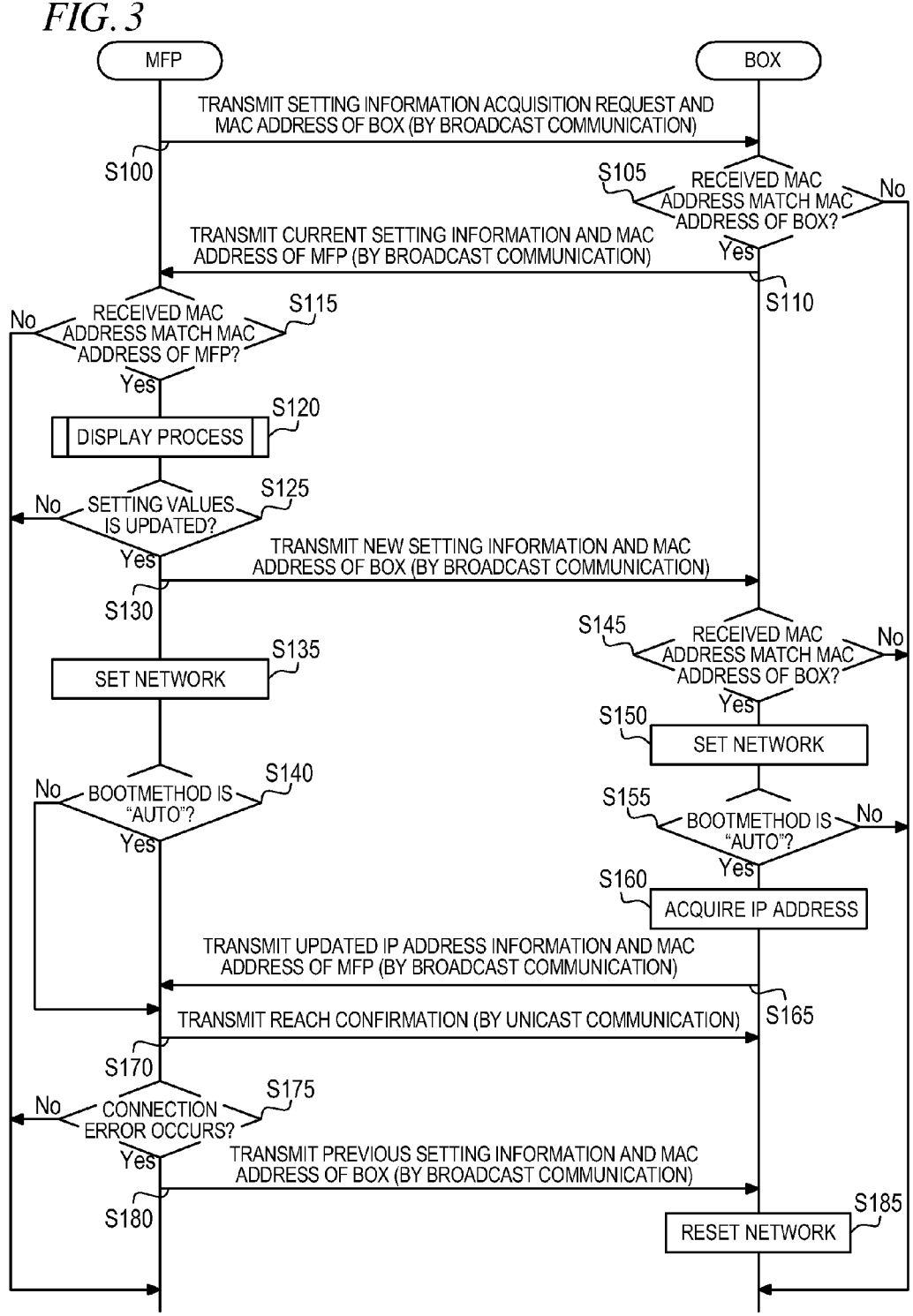

INFORMATION DISPLAY APPARATUS, INFORMATION PROVIDING APPARATUS, AND COMMUNICATION SYSTEM

CROSS-REFERENCE TO RELATED APPLICATION

This application claims priority from Japanese Patent Application No. 2012-214208, filed on Sep. 27, 2012, the entire subject matter of which is incorporated herein by reference.

TECHNICAL FIELD

Aspects of the present invention relate to an information providing apparatus, an information display apparatus which are connected to a network.

BACKGROUND

There has been known a system where setting information of an image forming apparatus is displayed on an operation panel of another image forming apparatus connected to the same LAN (for example, JP-A-2006-79353). In this system, the setting information is transmitted through the LAN from the image forming apparatus to the other image forming apparatus for displaying the setting information.

However, when the network addresses of the image forming apparatuses are different from each other between the image forming apparatuses, it would be not possible to perform unicast communication, so that the setting information cannot be transmitted to the image forming apparatus for display.

SUMMARY

Accordingly, an aspect of the present invention provides a technique of reliably providing information from an information providing apparatus connected to a network to an information display apparatus.

According to an illustrative embodiment of the present invention, there is provided an information display apparatus configured to communicate image data with an information providing apparatus through a network. The information display apparatus includes a processor, and memory storing computer-readable instructions, the computer-readable instructions, when executed by the processor, causing the information display apparatus to execute operations. The operations include transmitting, through the network, an information transmission request for requesting transmission of specific information related to the information providing apparatus to a plurality of apparatuses connected to the network by broadcast communication, receiving the specific information transmitted, through the network, from the information providing apparatus to a plurality of apparatuses connected to the network by broadcast communication, as a response to the information transmission request, and controlling a display unit to display the specific information received as the response to the information transmission request.

According to this configuration, the information display apparatus transmits the information transmission request by broadcast communication, and receives the specific information from the information providing apparatus having received the information transmission request by broadcast communication. Therefore, even when network setting of the information providing apparatus or the information display apparatus is not appropriate, and thus, unicast communication between those apparatuses cannot be performed, the specific information can be reliably provided from the information providing apparatus to the information display apparatus.

According to another illustrative embodiment of the present invention, there is provided an information providing apparatus configured to communicate image data with an information display apparatus through a network. The information providing apparatus includes a processor, and memory storing computer-readable instructions, the computer-readable instructions, when executed by the processor, causing the information providing apparatus to execute operations. The operations include receiving an information transmission request transmitted, through the network, from the information display apparatus to a plurality of apparatuses connected to the network by broadcast communication, the information transmission request requesting transmission of specific information related to the information providing apparatus, and transmitting, through the network, the specific information to a plurality of apparatuses connected to the network by broadcast communication in response to receiving the information transmission request.

According to this configuration, if the information transmission request transmitted from the information display apparatus by broadcast communication is received, in response to the information transmission request, the information providing apparatus transmits the specific information by broadcast communication. Therefore, even when network setting of the information providing apparatus or the information display apparatus is not appropriate, and thus, unicast communication between those apparatuses cannot be performed, the specific information can be reliably provided from the information providing apparatus to the information display apparatus.

Also, the inventive concept of the present invention can be implemented in various forms such as an information display program, an information providing program, non-transitory computer-readable media having the information display program or the information providing program recorded thereon, a communication system including the information display apparatus and the information providing apparatus, an information display method, and an information providing method.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 3 is a flowchart illustrating a setting process;

DETAILED DESCRIPTION

Hereinafter, illustrative embodiments of the present invention will be described with reference to the accompanying drawings. Embodiments of the present invention are not limited to the following illustrative embodiments, and various forms can be used as long as they are included in the technical scope of the present invention.

[1. Overall Configuration]

Figure 1:
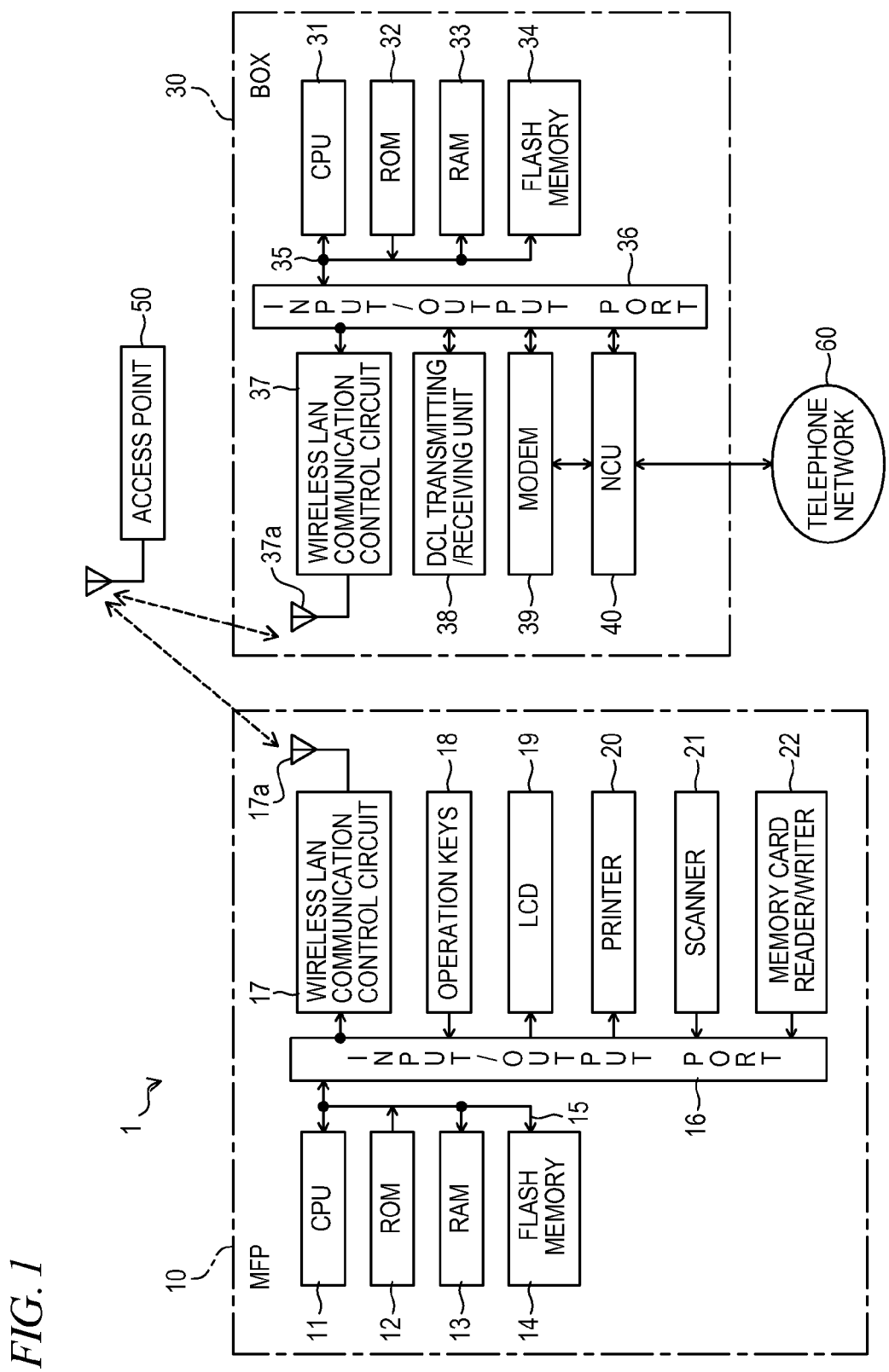
FIG. 1 is a block diagram illustrating the configurations of a multi-function peripheral (MFP) and a communication control device (BOX)

FIG. 1 is a block diagram illustrating a multi-function peripheral (MFP) 10 and a communication control device (BOX) 30 which configure a communication system 1 according to the present illustrative embodiment. The MFP 10 and the BOX 30 form one pair, and in each of the MFP 10 and the BOX 30, identification information (MAC address) of another apparatus paired with the corresponding apparatus is stored.

The MFP 10 and the BOX 30 are wireless LAN clients capable of data communication based on TCP/IP by wireless communication of a wireless LAN scheme. A wireless LAN access point (AP) 50 is a known wireless LAN access point capable of data communication by wireless communication of the wireless LAN scheme. The wireless LAN scheme is, for example, a communication scheme which is defined by IEEE standards 802.11a/b/g/n.

In wireless communication of the wireless LAN scheme, two communication modes are provided, that is, an ad hoc mode (also referred to as an Ad mode) and an infrastructure mode (also referred to as an Inf mode). The MFP 10 and the BOX 30 can perform communication in either mode.

The Inf mode is a mode in which wireless LAN clients perform communication through a wireless LAN access point, and in the present illustrative embodiment, as an example, communication based on Wi-Fi is performed. In a case of performing communication in the Inf mode, the MFP 10 and the BOX 30 are connected together with a PC 70, a mobile device 71 to a wireless LAN through an AP 50 (see FIG. 2A).

Meanwhile, the Ad mode is a mode in which direct communication is performed between wireless LAN clients, and in the present illustrative embodiment, between the MFP 10 and the BOX 30, as an example, peer-to-pear communication based on Wi-Fi is performed.

The MFP 10 includes a CPU 11, a ROM 12, a RAM 13, a flash memory 14, a wireless LAN communication control circuit 17, and a memory card reader/writer 22. Further, the MFP 10 includes an inkjet type printer 20 provided at a lower portion, a flatbed type scanner 21 provided at an upper portion, and an operation panel provided at an upper portion of the front surface and including operation keys 18 and an LCD 19.

The CPU 11, the ROM 12, the RAM 13, and the flash memory 14 are connected to one another through a bus line 15. The wireless LAN communication control circuit 17, the operation keys 18, the LCD 19, the printer 20, the scanner 21, the memory card reader/writer 22, and the bus line 15 are connected to one another through an input/output port 16.

The CPU 11 controls each function or each component connected to the input/output port 16 according to fixed values or programs stored in the ROM 12 or the like, or various signals which are transmitted or received through the wireless LAN communication control circuit 17.

The ROM 12 stores a variety of data such as programs which are for performing various processes and are executed in the MFP 10. The flash memory 14 stores various setting values related to the wireless LAN, such as the IP address and MAC address of the MFP 10, and the IP address and MAC address of the BOX 30 paired with the MFP 10. Further, at manufacturing, the setting values related to the wireless LAN may be stored such that the MFP 10 and BOX 30 forming a pair can perform data communication with each other in the Ad mode.

The wireless LAN communication control circuit 17 includes an antenna 17a for the wireless LAN, and transmits or receives digital signals to or from another communication apparatus (for example, the BOX 30, the AP 50, or the like) by wireless communication of the wireless LAN scheme.

Meanwhile, the BOX 30 performs control on communication using a telephone network 60, and is connected to the telephone network 60. The BOX 30 includes a CPU 31, a ROM 32, a RAM 33, a flash memory 34, a wireless LAN communication control circuit 37, a DCL transmitting/receiving unit 38, a modem 39, and an NCU 40.

The CPU 31, the ROM 32, the RAM 33, and the flash memory 34 are connected to one another by a bus line 35. The wireless LAN communication control circuit 37, the DCL transmitting/receiving unit 38, the modem 39, the NCU 40, and the bus line 35 are connected to one another by an input/output port 36.

The CPU 31 controls each function and controls each component connected to the input/output port 36 according to fixed values or programs stored in the ROM 32 or the like, or various signals which are transmitted or received through the wireless LAN communication control circuit 37.

The ROM 32 stores a variety of data such as programs which are for performing various processes and are executed in the BOX 30. The flash memory 34 stores various setting values related to the wireless LAN, such as the IP address and MAC address of the BOX 30, and the IP address and MAC address of the MFP 10 paired with the BOX 30. Further, at manufacturing, the setting values related to the wireless LAN may be stored such that the MFP 10 and BOX 30 forming a pair can perform data communication with each other in the Ad mode.

The wireless LAN communication control circuit 37 includes an antenna 17a for the wireless LAN, and transmits or receives digital signals to or from another communication apparatus (for example, the MFP 10, the AP 50, or the like) by wireless communication of the wireless LAN scheme.

The DCL transmitting/receiving unit 38 performs wireless communication with a cordless handset (not shown) through a DCL antenna (not shown), thereby operating a telephone function.

The modem 39 modulates document data to be transmitted by a facsimile function into a signal which is transmittable to the telephone network 60, and transmits the modulated signal, or receives a signal input from the telephone network 60 through the NCU 40, and demodulates the received signal into document data.

[2. Outline of Process]

Subsequently, the operations of the MFP 10 and the BOX 30 will be described. As described above, the MFP 10 and the BOX 30 are configured to operate in a pair. An example of functions which are implemented by that operation includes a facsimile transmitting function in which the MFP 10 reads image data by the scanner 21 and transmits the image data to the BOX 30 through a wireless LAN, and the BOX 30 transmits the image data to the telephone network 60. Instead of reading images by the scanner 21, the MFP 10 may read image data from a memory card by use of the memory card reader/writer 22, or may receive image data from the PC 70 or the like.

In addition to the facsimile transmitting function, an example of functions which are implemented by that operation includes a facsimile receiving function in which the BOX 30 transmits image data received from the telephone network 60, to the MFP 10 through the wireless LAN, and the MFP 10 prints the image data by the printer 20. Further, instead of printing the image data by the printer 20, the MFP 10 may store the image data in a memory card by use of the memory card reader/writer 22, or may transmit the image data to the PC 70 or the like.

In the present illustrative embodiment, the BOX 30 does not include operation keys and an LCD, and the MFP 10 paired with the BOX 30 and connected to the BOX 30 through a wireless LAN may be used to perform setting of the BOX 30. Further, when the MFP 10 and the BOX 30 perform communication in the Inf mode through the wireless LAN, the MFP 10 and the BOX 30 perform communication with each other through the AP 50.

Figure 2A:
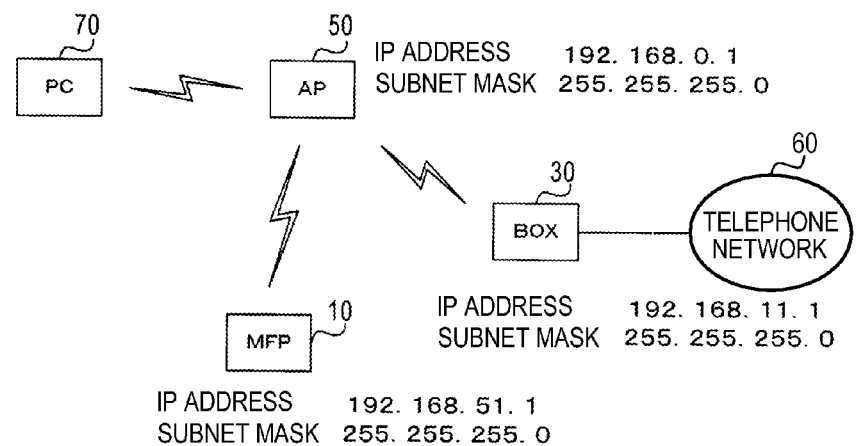
FIGS. 2A and 2B are explanatory views illustrating communication between the MFP and the BOX.

Here, it is assumed that the IP address of the MFP 10 is set to 192.168.51.1, the IP address of the BOX 30 is set to 192.168.11.1, and the IP address of the AP 50 is set to 192.168.0.1, and thus, the network addresses of these apparatuses are different from one another (see FIG. 2A). Further, it is assumed that the MFP 10 transmits a packet to a transmission destination IP address which is the IP address 192.168.11.1 of the BOX 30 by unicast communication. Furthermore, it is assumed that the AP 50 has a gateway function.

In this case, since the network address 192.168.11.00 of the transmission destination IP address is different from the network address 192.168.0.0 of the AP 50, the AP 50 transmits the packet to another network, and thus the packet does not reach the BOX 30. Also, when the BOX 30 transmits a packet to the MFP 10 by unicast communication, due to the same reason, the packet does not reach the MFP 10 (see FIG. 2B).

That is, when setting related to a network, such as an IP address, in the MFP 10 or the BOX 30 is not appropriate, unicast communication between the MFP 10 and the BOX 30 cannot be performed. Therefore, the MFP 10 cannot be used to change the network-related setting of the BOX 30. Further, since the BOX 30 does not have an operation unit or the like, there is a concern that communication between the MFP 10 and the BOX 30 cannot be recovered.

Figure 2B:
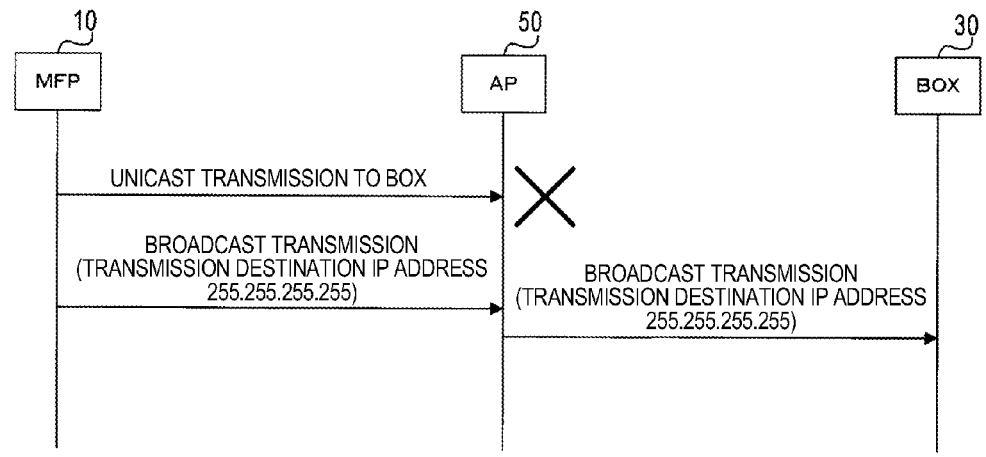

In contrast, in the present illustrative embodiment, when an apparatus connected to the wireless LAN transmits a packet by broadcast communication while designating a transmission destination IP address to 255.255.255.255, the AP 50 transmits the packet to all apparatuses connected to the wireless LAN (see FIG. 2B). Therefore, when the MFP 10 is used to change a setting value of a network-related item (network item) of the BOX 30, a packet (broadcast packet) having transmission destination IP address of 255.255.255.255 is used to perform broadcast communication between the MFP 10 and the BOX 30.

Therefore, even if the setting value of a network item of the MFP 10 or the BOX 30 is inappropriate, it is possible to reliably transmit and receive packets between the MFP 10 and the BOX 30, and it becomes possible to use the MFP 10 to change the setting values of the network items of the BOX 30 into appropriate values.

The network items, for example, may include a BootMethod (IP address acquiring method), an IP address, a Subnet mask, a Gateway address, and the like. Setting values settable for the BootMethod may include a "STATIC" for manually setting an IP address, and an "AUTO" for automatically setting an IP address by DHCP or the like.

[3. Setting Process]

Subsequently, a setting process of setting the network items of the MFP 10 or the BOX 30 through the operation keys 18 of the MFP 10 will be described in detail with reference to a flowchart shown in FIG. 3. The following process is implemented by the operations of the CPU 11 of the MFP 10 and the CPU 31 of the BOX 30 according to programs stored in the ROMs 12, 32.

If the CPU 11 of the MFP 10 receives a request for setting the network items of the MFP 10 and the BOX 30, through the operation keys 18, the CPU 11 generates a setting information acquisition request, and transmits the setting information acquisition request to the wireless LAN (Step S100). The setting information acquisition request is a broadcast packet for requesting the BOX 30 to provide the current setting values of the network items.

Here, the MFP 10 is configured to monitor and control the BOX 30 by SNMP, and the broadcast packet has a structure based on the SNMP. The SNMP is provided with a command "GET REQUEST" which is used to acquire information from an apparatus, and a command "SET REQUEST" which is used to change setting of an apparatus. Normally, it can be considered to use the command "GET REQUEST" as the setting information acquisition request. However, in transmitting the command "GET REQUEST" by broadcast communication, there is a problem in protocol (to be described below in detail). Therefore, in the present illustrative embodiment, the command "SET REQUEST" is used as the setting information acquisition request.

In the setting information acquisition request, an object ID (OID) which is "TCP/IP Get" representing a request for acquiring the current setting values of the network items is designated, and the MAC address of the BOX 30 is set corresponding thereto. Also, an OID corresponding to each of the network items (BootMethod, IP address, Subnet mask, Gateway address, and the like) of the BOX 30 is designated.

Meanwhile, if the CPU 31 of the BOX 30 receives the setting information acquisition request, the CPU 31 determines whether the MAC address which is a setting value corresponding to the "TCP/IP Get" matches the MAC address of the BOX 30 (Step S105). When the result of the determination is positive (Yes in Step S105), the CPU 31 generates current setting information which is a broadcast packet including the current setting values of the network items, and transmits the current setting information to the wireless LAN (Step S110).

As described above, the CPU 11 of the MFP 10 transmits the setting information acquisition request using the command "SET REQUEST" in Step S100. The reason is that in the SNMP, when "GET REQUEST" is used as a command, the BOX 30 can perform unicast communication in response to "GET REQUEST", but cannot perform broadcast communication. Meanwhile, when "SET REQUEST" is used as a command, the BOX 30 can perform not only unicast communication but also broadcast communication. In Step S110, the CPU 31 of the BOX 30 transmits the current setting information which is a broadcast packet, to the wireless LAN. In order to cause Step S110 to be enabled, the CPU 11 of the MFP 10 transmits the setting information acquisition request using "SET REQUEST" (Step S100).

In Step S110, "SET REQUEST" is used as the current setting information. Further, in the current setting information, an OID "TCP/IP Update" representing a request for updating the setting values of the network items is designated, and the MAC address of the MFP 10 is set corresponding thereto. Also, OIDs corresponding to the individual network items of the BOX 30 are designated, and the current setting values of the BOX 30 is set corresponding to those OIDs.

The current setting information is to provide the current setting values of the network items from the BOX 30 to the MFP 10, and does not request updating of the setting values, but the OID "TCP/IP Update" is designated. It is noted that the designation of "TCP/IP Update" in the current setting information is slightly different from an original usage.

If the CPU 11 of the MFP 10 receives the current setting information, the CPU 11 determines whether the MAC address which is a setting value corresponding to "TCP/IP Update" matches the MAC address of the MFP 10 (Step S115). When the result of the determination is positive (Yes in Step S115), the CPU 11 performs a display process (to be described below in detail) for changing the settings of the MFP 10 and the BOX 30 (Step S120).

In Step S125, the CPU 11 determines whether the setting value of any network item of the BOX 30 is changed by the display process. When the result of the determination is positive (Yes in Step S125), the CPU 11 generates new setting information which is a broadcast packet for requesting the BOX 30 to update the network items with the changed setting value (new setting value), and transmits the new setting information to the wireless LAN (Step S130).

The "SET REQUEST" is used as the new setting information, and in the new setting information, the "TCP/IP Update" is designated, and the MAC address of the BOX 30 is set corresponding thereto. Also, OIDs corresponding to the individual network items of the BOX 30 are designated, a new setting value of the BOX 30 is set corresponding to the OID of the changed network item, and the current setting values of the BOX 30 are set corresponding to the OIDs of the other network items.

In Step S135, when the CPU 11 receives changing of the setting value of a network item of the MFP 10 by the display process, the CPU 11 updates the network item with the new setting value.

In Step S140, the CPU 11 determines whether the item BootMethod is changed from "STATIC" to "AUTO". When the result of the determination is positive (Yes in Step S140), the CPU 11 waits for reception of the IP address of the BOX 30 updated by an IP address providing server (updated IP address). Meanwhile, when the result of the determination is negative (No in Step S140), the CPU 11 transmits a packet whose transmission destination is the new setting value of the IP address of the BOX 30 (the current setting value when the IP address is not changed), by unicast communication (Step S170). Then, the CPU 11 waits for a response to the packet from the BOX 30, and the process proceeds to Step S175.

Meanwhile, if the CPU 31 of the BOX 30 receives the new setting information, the CPU 31 determines whether the MAC address which is a setting value corresponding to "TCP/IP Update" matches the MAC address of the BOX 30 (Step S145). When the result of the determination is positive (Yes in Step S145), the CPU 31 updates the network item with the new setting value included in the new setting information (Step S150).

Subsequently, the CPU 31 determines whether the item BootMethod is changed from "STATIC" to "AUTO" (Step S155). When the result of the destination is positive (Yes in Step S155), in Step S160, the CPU 31 acquires the IP address of the BOX 30, the Gateway address, and the like from the IP address providing server connected to the wireless LAN, and updates the IP address (Step S160).

Then, in Step S165, the CPU 31 generates updated IP address information which is a broadcast packet including the updated IP address, and transmits the updated IP address information to the wireless LAN. The "SET REQUEST" is used as the updated IP address information, and in the updated IP address information, the "TCP/IP Update" is designated, and the MAC address of the MFP 10 is set corresponding thereto. An OID corresponding to the IP address of the BOX 30 is designated, and the updated IP address of the BOX 30 is set corresponding to that OID.

The CPU 11 of the MFP 10 having received the updated IP address information determines whether the MAC address which is a setting value corresponding to "TCP/IP Get" matches the MAC address of the MFP 10. When the result of the determination is positive, the CPU 11 stores the updated IP address set in the updated IP address information, as the IP address of the BOX 30 in the flash memory 14. Thereafter, the CPU 11 transmits a packet whose transmission destination is the updated IP address, by unicast communication, thereby notifying the BOX 30 that the IP address is updated (Step S170), and the CPU 11 waits for a response to the packet from the BOX 30, and the process proceeds to Step S175. Meanwhile, when the result of the determination is negative, the CPU 11 repeats the determination until the result of the determination becomes positive.

In Step S175, the CPU 11 determines whether a response is received from the BOX 30. When a response cannot be received (Yes in Step S175), the CPU 11 considers that a connection error has occurred, generates an previous setting information which is a broadcast packet for requesting the BOX 30 to return the network items to the original setting values (previous setting values), and transmits the previous setting information to the wireless LAN (Step S180).

The "SET REQUEST" is used as the previous setting information. In the previous setting information, the "TCP/IP Update" is designated, and the MAC address of the BOX 30 is set corresponding thereto. Further, OIDs corresponding to the individual network items of the BOX 30 are designated and a previous setting value is set corresponding to the OID of a network item having been changed to a new setting value, and current setting values are set corresponding to the OIDs of the other network items.

Meanwhile, if the CPU 31 of the BOX 30 receives the previous setting information, the CPU 31 determines whether the MAC address which is a setting value corresponding to the "TCP/IP Update" matches the MAC address of the BOX 30. When the result of the determination is positive, the CPU 31 updates the network item having updated with the new setting value, with the previous setting value included in the previous setting information (Step S185).

In the meantime, in the setting information acquisition request, the new setting information, and the previous setting information, the MAC address of the BOX 30 is set. However, instead of the MAC address of the BOX 30, the MAC address of the MFP 10 may be set. In this case, it can be considered in Step S105, S145, or S185 that the BOX 30 determines whether the MAC address set in the broadcast packet matches the MAC address of the MFP 10 stored in the flash memory 34.

Also, in the current setting information and the updated IP address information, the MAC address of the MFP 10 is set. However, instead of the MAC address of the MFP 10, the MAC address of the BOX 30 may be set. In this case, it can be considered in Step S115 or S170 that the MFP 10 determines whether the MAC address set in the broadcast packet matches the MAC address of the BOX 30 stored in the flash memory 14.

Also, instead of the MAC addresses, serial IDs uniquely set for the MFP 10 and the BOX 30 may be used, or other information such as authentication information set for the MFP 10 and the BOX 30 making a pair may be used. Even in this case, the same effects can be achieved.

[4. Display Process]

Figure 4:
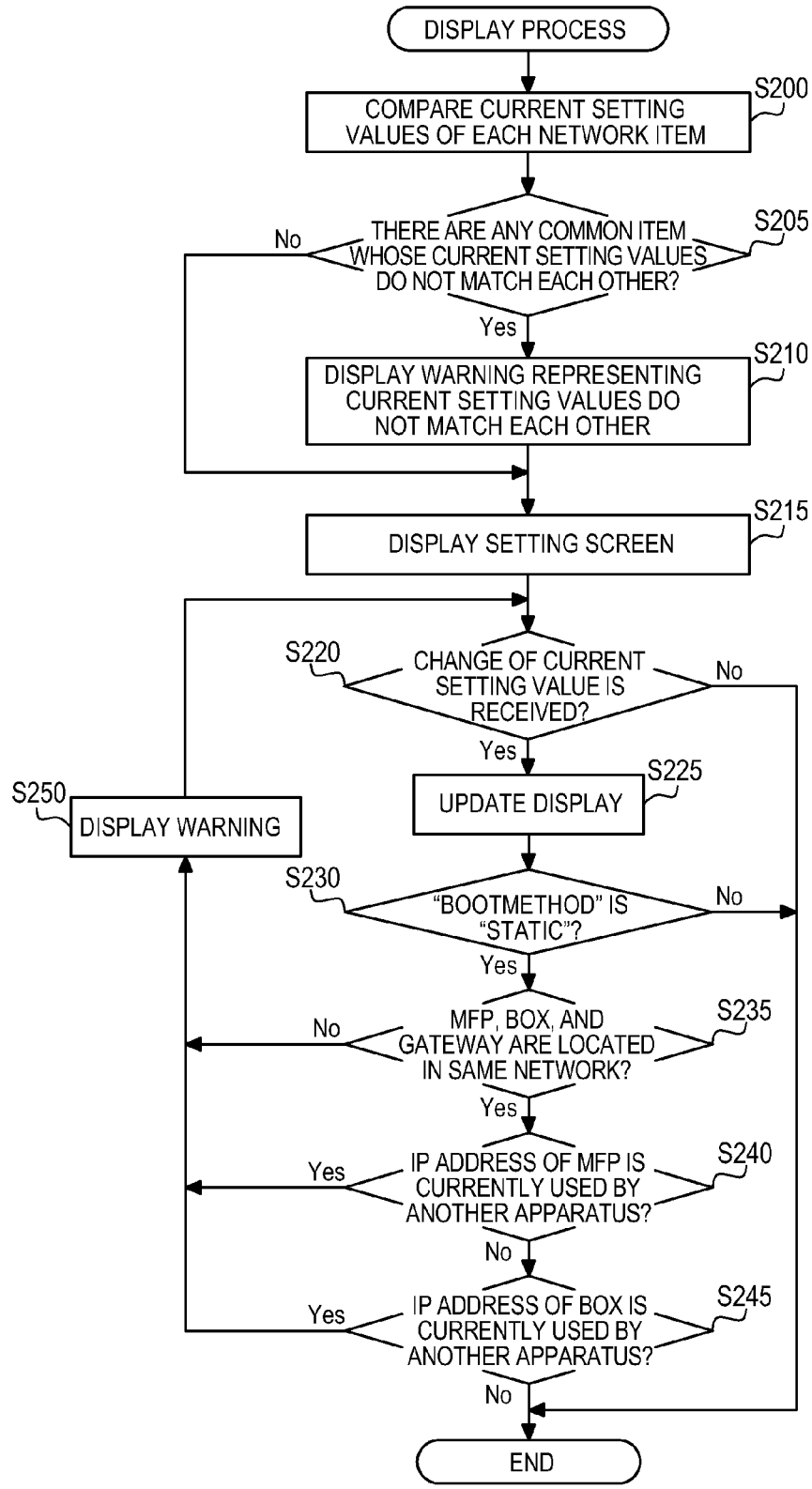
FIG. 4 is a flowchart illustrating a display process.

Subsequently, the display process of receiving change of the setting values of the network items of the MFP 10 and the BOX 30 (the process which is performed in Step S120 of the setting process) will be described with reference to a flowchart shown in FIG. 4.

The CPU 11 of the MFP 10 compares the current setting value of each network item of the MFP 10 with the current setting value of a corresponding network item of the BOX 30 (Step S200), and the process proceeds to Step S205.

Here, if the setting values of the MFP 10 are not the same as the setting values of the BOX 30, the CPU 11 sets network items (such as the BootMethod, the Subnet mask, and the Gateway address) which have a possibility of causing normal communication between the MFP 10 and the BOX 30 unable, as common items. Also, the CPU 11 sets network items (such as the IP address) other than the common items, as individual items.

In Step S205, the CPU 11 determines whether there is any common item whose current setting values do not match each other between the MFP 10 and the BOX 30. When the result of the determination is positive (Yes in Step S205), the process proceeds to Step S210, whereas when the result of the determination is negative (No in Step S205), the process proceeds to Step S215.

In Step S210, with respect to the common item whose current setting values do not match each other between the MFP 10 and the BOX 30, the CPU 11 displays information representing that the current setting values do not match each other, on the LCD 19. Then, the process proceeds to Step S215.

In Step S215, the CPU 11 displays a setting screen for changing the current setting values of the network items of the MFP 10 and the BOX 30, on the LCD 19. Then, the process proceeds to Step S220.

Figure 5A:
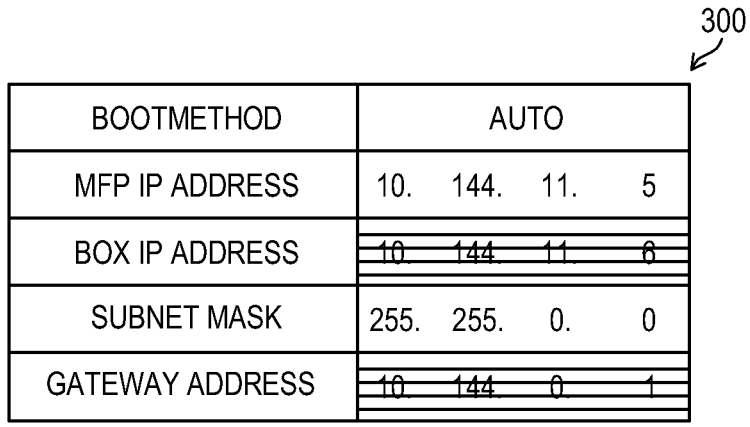
FIGS. 5A to 5C are explanatory views illustrating setting screens.
Figure 5B:
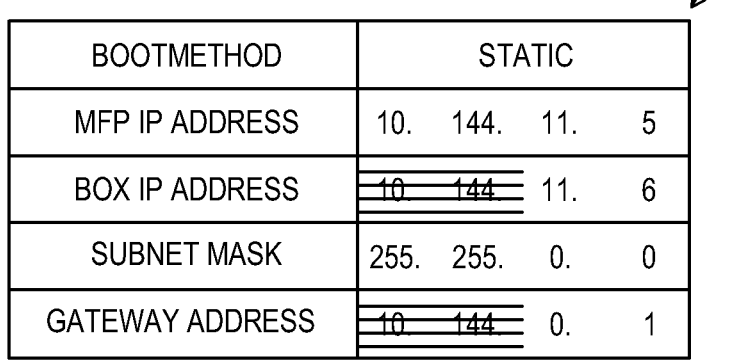

As examples of the setting screen, FIG. 5A shows a setting screen 300 when the BootMethod is "AUTO", and FIG. 5B shows a setting screen 310 when the BootMethod is "STATIC".

As shown in the setting screens 300 and 310, with respect to an individual item (IP address), display sections are separately provided for the MFP 10 and the BOX 30, and the current setting values of the MFP 10 and the BOX 30 are separately displayed. Meanwhile, with respect to each common item (such as the BootMethod), one display section is provided. When the current setting values of a common item match each other between the MFP 10 and the BOX 30, either one of current setting values is displayed, whereas when the current setting values of a common item do not match each other, the current setting value of the MFP 10 is displayed (it is noted that the current setting value of the BOX 30 may be displayed).

When the BootMethod is "AUTO", since automatic setting of IP addresses and gateway addresses is performed, the IP address of the BOX 30 and the Gateway address become unchangeable. Therefore, on the setting screen 300, the setting values of the IP address and the Gateway address of the BOX 30 are displayed in a mode different from that of the other items (a mode different in background), whereby it is indicated that the IP address of the BOX 30 and the Gateway address cannot be changed.

The user can change the IP address and the Subnet mask of the MFP 10 in the setting screen 300. If the user changes the IP address of the MFP 10, in response to the corresponding changing operation, the BootMethod is changed from "AUTO" to "STATIC". Also, if the user changes the Subnet mask, according to the changed Subnet mask, for example, a screen like the setting screen 310 (to be described below in detail) is displayed. It is noted that, in the setting screen 300, the IP address of the MFP 10 and the Subnet mask may be unchangeable.

When the BootMethod is "STATIC", it is set to be not possible to directly change network portions of the setting values of the IP address of the BOX 30 and the Gateway address (to be described below in detail). Therefore, in the setting screen 310, the network portions are displayed in a mode different from that of the other portions (a mode different in background), whereby it is indicated that the values of those network portions cannot be directly changed.

In Step S220, the CPU 11 determines whether an operation to change the current setting values of the network items is received through the operation keys 18. When changing operation is received (Yes in Step S220), the process proceeds to Step S225, whereas when changing operation is not received (No in Step S220), the CPU 11 terminates the present process.

In Step S225, the CPU 11 updates the current setting values displayed corresponding to the network items, with the new setting values input by the changing operation, on the setting screen.

Here, the operation for changing the current setting values will be described below in detail. The CPU 11 receives an operation to change the current setting value of a network item, through the operation keys 18, and updates the corresponding current setting value displayed on the setting screen, with a new setting value, in response to the changing operation.

With respect to each common item, the CPU 11 considers that new setting values are simultaneously input for the MFP 10 and the BOX 30 by changing operation. It is noted that the current setting values of the MFP 10 and the BOX 30 related to each common item may be separately displayed on the setting screen, and an operation to change each of the current setting values may be separately received.

As described above, when the BootMethod is "AUTO", the CPU 11 does not receive an operation to change the IP address and the Gateway address of the BOX 30.

Further, when the BootMethod is "STATIC", the network portions of the IP address of the MFP 10 and the BOX 30 and the Gateway address are changed in conjunction with each other.

That is, if the CPU 11 receives an operation to change the network portion of the IP address of the MFP 10, the CPU 11 considers that the same operation is also performed on the network portions of the IP address of the BOX 30 and the Gateway address. Therefore, in response to the changing operation, the CPU 11 simultaneously updates the network portions of the IP address of the MFP 10, the IP address of the BOX 30, and the Gateway address, on the setting screen. When receiving the changing operation, the CPU 11 considers that new setting values with the changed network portions are simultaneously input with respect to the IP address of the MFP 10 and the BOX 30 and the Gateway address.

With respect to each of the host portions of the IP address of the BOX 30 and the Gateway address (portions except the network portions), the CPU 11 separately receives a changing operation.

It is noted that the present invention is not limited to the above described changing operation, and when the BootMethod is "STATIC", in conjunction with an operation to change the network portion of the IP address of the BOX 30 or the Gateway address, the network portion of the IP address of the MFP 10 and the like may be changed. Also, without such conjunction operation, an operation to change each of the setting values of the IP address of the MFP 10 and the BOX 30 and the Gateway address may be separately received.

In Step S230, the CPU 11 determines whether the current setting value of the BootMethod (new setting value when an operation to change the BootMethod is performed) is "STATIC". When the result of the determination is positive (Yes in Step S230), the process proceeds to Step S235, whereas when the result of the determination is negative (No in Step S230), the CPU 11 terminates the display process.

In Step S235, the CPU 11 computes the network addresses of the MFP 10, the BOX 30, and the Gateway based on the new setting values of the IP address of the MFP 10 and the BOX 30, the Subnet mask, and the Gateway address (current setting values when an operation to change these network items is not performed). Then, based on the result of the computation, the CPU 31 determines whether the MFP 10, the BOX 30, and the Gateway are located in the same network. When the result of the determination is positive (Yes in Step S235), the process proceeds to Step S240, whereas when the result of the determination is negative (No in Step S235), the process proceeds to Step S250.

When an operation to change the IP address of the MFP 10 is performed, in Step S240, the CPU 11 determines whether the new setting value of the IP address (new IP address) of the MFP 10 is currently used by another apparatus, according to an address resolution protocol (ARP).

Specifically, the CPU 11 transmits a broadcast packet designating the new IP address as a communication counterpart in accordance with the ARP, and waits for reception of a packet including the MAC address of an apparatus for which the new IP address is set in response to the broadcast packet.

When a response is obtained, the CPU 11 considers that the new IP address of the MFP 10 is currently used (Yes in Step S240), and the process proceeds to Step S250. Meanwhile, when any response is not obtained, the CPU 11 considers that the new IP address of the MFP 10 is not currently used (No in Step S240), and the process proceeds to Step S245.

When an operation to change the IP address of the BOX 30 is performed, in Step S245, like in Step S240, the CPU 11 determines whether the new IP address of the BOX 30 is currently used by another apparatus in accordance with the ARP. Then, when the new IP address is currently used (Yes in Step S245), the process proceeds to Step S250, whereas when the new IP address is not currently used (No in Step S245), the CPU 11 terminates the display process.

Here, the case of determining in Step S245 that the new IP address of the BOX 30 is currently used is a case of receiving a packet including the MAC address of an apparatus which is different from the BOX 30 and for which the new IP address is already set, in response to the broadcast packet designating the new IP address of the BOX 30. Further, the case of determining in Step S245 that the new IP address of the BOX 30 is not currently used is a case where the CPU 11 does not receive a packet including the MAC address of an apparatus which is different from the BOX 30, from the different apparatus.

Figure 5C:
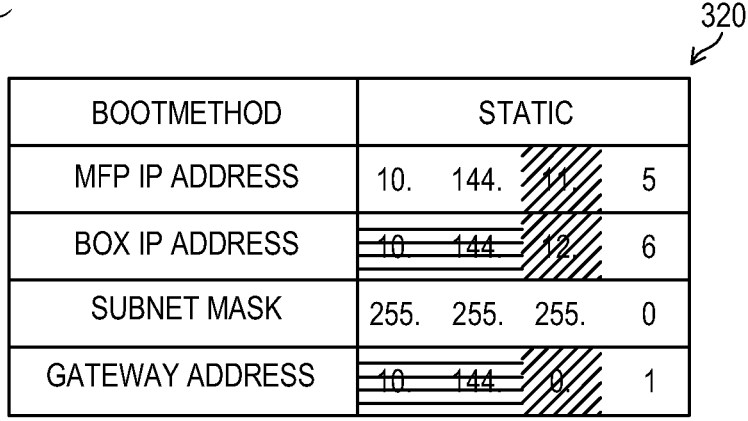

In Step S250, the CPU 11 displays a warning screen indicating that the new setting value of the network item of the MFP 10 or the BOX 30 has an error, on the LCD 19, and the process proceeds to Step S220. FIG. 5C shows an example of a warning screen 320 which is displayed when the MFP 10, the BOX 30, and the Gateway are not located in the same network. On the warning screen 320, different portions in the network portions of IP addresses of the MFP 10 and the BOX 30 and the Gateway address are displayed in a mode different from that of the other portions (a form different in background). Also, when the new IP address of the MFP 10 or the new IP address of the BOX 30 is currently used, a message indicating that the new IP address is currently used may be displayed on the warning screen.

[Effects]

In the communication system 1 of the present illustrative embodiment, when using the MFP 10 to change the setting values of the network items of the BOX 30, communication using broadcast packets is performed between the MFP 10 and the BOX 30. Therefore, even when the setting values of the network items of the BOX 30 are not appropriate such that unicast communication cannot be performed between the MFP 10 and the BOX 30, it is possible to use the MFP 10 to reliably acquire the current setting values of the network items of the BOX 30, and display the current setting values on the setting screen. Also, it is possible to reliably provide the new setting values of the network items to the BOX 30, and control the BOX 30 such that the current setting values are changed to the new setting values. Therefore, even when the BOX 30 does not have an operation unit or the like, it is possible to use the MFP 10 to reliably set the network items of the BOX 30, and to recover communication between the MFP 10 and the BOX 30.

Further, the broadcast packets include the MAC address of the MFP 10 or the BOX 30. Then, the MFP 10 receives changes of setting values only when the MAC address included in a broadcast packet matches the MAC address of the MFP 10, and the BOX 30 updates the network items only when the MAC address included in a broadcast packet matches the MAC address of the BOX 30. Therefore, it is possible to prevent the setting values of the BOX 30 from being changed by a packet received from another apparatus.

In the above illustrative embodiment, the MFP 10 is an example of an information display apparatus, and the BOX 30 is an example of an information providing apparatus.

Further, Step S100 of the setting process is an example of a request transmitting means and a request transmitting process, Step S105 is an example of a request receiving means and a request receiving process, Step S110 is an example of a specific information transmitting means and a specific information transmitting process, Step S115 is an example of a specific information receiving means and a specific-information receiving process, and Step S130 is an example of a new setting value transmitting means. Furthermore, Step S145 is an example of a new setting value receiving means, Step S150 is an example of a changing means, Step S155 is an example of an acquisition method determining means, Step S160 is an example of an IP address acquiring means, and Step S165 is an example of an IP address transmitting means.

Also, Step S205 of the display process is an example of a setting value determining means, Step S210 is an example of a display control means, Step S215 is an example of a display control means and a display control process, Step S220 is an example of a setting value change detecting means and an IP address change detecting means, Step S225 is an example of a display control means, and Step S230 is an example of an acquisition method determining means. Further, Step S235 is an example of a network determining means, Steps S240 and S245 are example of a command transmitting means and a command receiving means, and Step S250 is an example of a display control means.

Other Illustrative Embodiment

While the present invention has been shown and described with reference to certain illustrative embodiments thereof, it will be understood by those skilled in the art that various changes in form and details may be made therein without departing from the spirit and scope of the invention as defined by the appended claims.

(1) In the above-described illustrative embodiment, the MFP 10 and the BOX 30 are connected by the wireless LAN. However, the present invention is not limited thereto. The MFP 10 and the BOX 30 may be connected through any other network such as a wired LAN. Even in this case, similar effects can be achieved.

Also, not only with respect to the network items but also with respect to other items of the MFP 10 or the BOX 30, the setting values may be changed in the similar manner. Even in this case, the MFP 10 can be used to reliability change the setting values of the other items of the BOX 30.

Also, the present invention is not limited to the MFP 10 and the BOX 30, but can be applied to two apparatuses connected to a network. Between those apparatuses, communication using broadcast packets through the network can be performed in the similar manner as that in the present illustrative embodiment, whereby one apparatus can be used to reliably change the setting values of the other apparatus.

(2) Also, in Steps S100 and S105 of the present illustrative embodiment, the broadcast packets including the MAC address of the MFP 10 or the BOX 30 are used. However, a broadcast packet which does not include information such as a MAC address may be used. In this case, the MFP 10 can be used to more reliably acquire the setting values of the network items related to an apparatus other than the BOX 30, and to improve convenience.

(3) Also, in the above described illustrative embodiment, a configuration for changing the setting values of the MFP 10 or the BOX 30 through the operation keys 18 or LCD 19 of the MFP 10 has been exemplified. However, for example, a web server function may be set up in the MFP 10, and a setting screen for performing setting of the MFP 10 or the BOX 30 may be displayed on a web browser of a PC or the like connected to the wireless LAN, and the setting values may be changed according to an instruction input through the web browser. Even in this case, the similar effects can be achieved.

What is claimed is:

1. A communication system comprising an information display apparatus and an information providing apparatus which communicate image data with each other through a network, wherein the information display apparatus includes:
a first processor;
first memory storing first computer-readable instructions, the first computer-readable instructions, when executed by the first processor, causing the information display apparatus to execute operations including:
transmitting, through the network, an information transmission request for requesting transmission of specific information related to the information providing apparatus by broadcast communication, the information transmission request being SET REQUEST command of Simple Network Management Protocol (SNMP), the specific information representing a current providing-side setting value of the information providing apparatus and including a plurality of current providing-side setting values for a plurality of items of the information providing apparatus, the plurality of items including a common item and an individual item other than the common item;
receiving the specific information transmitted, through the network, from the information providing apparatus by broadcast communication, as a response to the information transmission request, the specific information being sent as SET REQUEST command of SNMP; and
controlling a display unit to display the specific information received as the response to the information transmission request including a providing-side setting value for the individual item, a display-side setting value for the individual item, either one the providing-side setting value and the display-side setting value for the common item, and information indicating that the providing-side setting value and the display-side setting value for the common item are different from each other if it is determined that the providing-side setting value and the display-side setting value for the common item are different from each other, and
wherein the information providing apparatus includes:
a second processor;
second memory storing second computer-readable instructions, the second computer-readable instructions, when executed by the second processor, causing the information providing apparatus to execute operations including:
receiving the information transmission request transmitted, through the network, from the information display apparatus by broadcast communication;
determining whether the providing-side setting value and the display-side setting value for the common item are same;
transmitting the specific information, through the network by broadcast communication in response to receiving the information transmission request and
transmitting, through the network, new setting value information including: at least one of providing-side identification information of the information providing apparatus and display-side identification information of the information display apparatus; and a new providing-side setting value for updating the providing-side setting value, by broadcast communication;
wherein each of a plurality of apparatuses connected to the network has unique identification information, and
wherein the common item is an item, for which a providing-side setting value set in the information providing apparatus should match a display-side setting value set in the information display apparatus.

2. An information display apparatus configured to communicate image data with an information providing apparatus through a network, the information display apparatus comprising:
a processor; and
memory storing computer-readable instructions, the computer-readable instructions, when executed by the processor, causing the information display apparatus to execute operations including:
transmitting, through the network, an information transmission request for requesting transmission of specific information related to the information providing apparatus by broadcast communication, the information transmission request being SET REQUEST command of Simple Network Management Protocol (SNMP), the specific information includes the specific information includes a plurality of current providing-side setting values for a plurality of items of the information providing apparatus, the plurality of items including a common item and an individual item other than the common item;

receiving the specific information transmitted, through the network, from the information providing apparatus as a response to the information transmission request, the specific information being sent as SET REQUEST command of SNMP;

determining whether the providing-side setting value and the display-side setting value for the common item are same; and controlling a display unit to display the specific information received as the response to the information transmission request including a providing-side setting value for the individual item, a display-side setting value for the individual item, either one the providing-side setting value and the display-side setting value for the common item, and information indicating that the providing-side setting value and the display-side setting value for the common item are different from each other if it is determined that the providing-side setting value and the display-side setting value for the common item are different from each other, and transmitting, through the network, new setting value information including: at least one of providing-side identification information of the information providing apparatus and display-side identification information of the information display apparatus; and a new providing-side setting value for updating the providing-side setting value, by broadcast communication, wherein each of a plurality of apparatuses connected to the network has unique identification information, and wherein the common item is an item, for which a providing-side setting value set in the information providing apparatus should match a display-side setting value set in the information display apparatus.

3. The information display apparatus according to claim 2, wherein the transmitting operation transmits the information transmission request including at least one of providing-side identification information of the information providing apparatus and display-side identification information of the information display apparatus, and wherein when the receiving operation receives the providing-side identification information or the display-side identification information together with the specific information, the controlling operation controls the display unit to display the specific information.

4. The information display apparatus according to claim 2, wherein the plurality of items include a network item related to the network, wherein the network item includes, as the common item, an address acquisition item, for which an Internet Protocol (IP) address acquiring method is set, wherein the operations further include:

determining whether a new address acquisition setting value newly set for the address acquisition item represents an acquisition method of manually acquiring an IP address, and when it is determined that the new address acquisition setting value represents the acquisition method of manually acquiring an IP address, determining whether new providing-side setting value for the network item and new display-side setting value for the network item are setting values causing the information providing apparatus and the information display apparatus to be located in the same network, wherein when it is determined that the new providing-side setting value and the new display-side setting value are not the setting values causing the information providing apparatus and the information display apparatus to be located in the same network, the controlling operation controls the display unit to display information representing that settings related to the network have an error.

5. The information display apparatus according to claim 4, wherein the network item further includes an IP address item as an individual item, and a gateway address item as a common item, wherein the operations further include detecting an input operation to change the providing-side setting value or the display-side setting value displayed on the display unit, and wherein when the detecting operation detects an input operation to change one of a providing-side setting value for the IP address item, a display-side setting value for the IP address item, and a gateway setting value for the gateway address item, the control operation controls the display unit to display the providing-side setting value and the display-side setting value for the IP address item, and the gateway setting value to be updated in response to the input operation.

6. The information display apparatus according to claim 5, wherein the detecting operation detects an input operation to change a specific portion of a predetermined setting value which is one of the providing-side setting value for the IP address item, the display-side setting value for the IP address item and the gateway setting value, and does not detect an input operation to change the specific portion of the other setting values, and wherein the specific portion is a portion which should have the same value among the providing-side setting value for the IP address item, the display-side setting value for the IP address item and the gateway setting value.

7. The information display apparatus according to claim 4, wherein the network item further includes an IP address item, for which an IP address is set, wherein the operations further include:

detecting an input operation to change a providing-side IP address which is the providing-side setting value for the IP address item, and transmitting, through the network, a confirmation command including a new IP address which is the providing-side IP address changed by the input operation, by broadcast communication; and receiving a response command including identification information of an apparatus, for which the new IP address is set, as a response to the confirmation command, from the apparatus, and wherein when receiving the response command from an apparatus other than the information providing apparatus, the controlling operation controls the display unit to display information representing that the new IP address cannot be used.

8. An information providing apparatus configured to communicate image data with an information display apparatus through a network, the information providing apparatus comprising:
- a processor; and
- memory storing computer-readable instructions, the computer-readable instructions, when executed by the processor, causing the information providing apparatus to execute operations including:
  - receiving an information transmission request transmitted, through the network, from the information display apparatus by broadcast communication, the information transmission request requesting transmission of specific information related to the information providing apparatus, the information transmission request being SET REQUEST command of Simple Network Management Protocol (SNMP) and including identification information uniquely set to each of a plurality of apparatuses connected to the network; and
  - transmitting, through the network, the specific information by broadcast communication in response to receiving the information transmission request, the specific information being sent as SET REQUEST command of SNMP, and including a current providing-side setting value of the information providing apparatus and information representing a plurality of providing-side setting values for a plurality of items of the information providing apparatus, the plurality of items including an Internet Protocol (IP) address item for which an IP address is set, and an address acquisition item for which an IP address acquiring method is set
  - receiving new setting value information which is transmitted from the information display apparatus through the network by broadcast communication and which includes: at least one of providing-side identification information of the information providing apparatus and display-side identification information of the information display apparatus; and a new providing-side setting value for updating the providing-side setting value; and
  - updating the providing-side setting value with the new providing-side setting value included in the new setting value information when receiving the new setting value information;
  - determining whether a new providing-side setting value for the address acquisition item represents an acquisition method of automatically acquiring an IP address;
  - when it is determined that the new providing-side setting value for the address acquisition item represents the acquisition method of automatically acquiring an IP address, acquiring a new IP address from an IP address providing server; and
  - transmitting, through the network, the new IP address and at least one of the providing-side identification information and the display-side identification information, by broadcast communication;
  - wherein when the received information transmission request includes at least one of providing-side identification information of the information providing apparatus and display-side identification information of the information display apparatus, the transmitting operation transmits the specific information, and
  - wherein when the received information transmission request does not include the providing-side identification information of the information providing apparatus nor the display-side identification information of the information providing apparatus, the transmitting operation does not transmits the specific information.

* * * * *

UNITED STATES PATENT AND TRADEMARK OFFICE
CERTIFICATE OF CORRECTION

| | | |
|---|---|---|
| PATENT NO. | : 9,854,112 B2 | Page 1 of 1 |
| APPLICATION NO. | : 14/039105 | |
| DATED | : December 26, 2017 | |
| INVENTOR(S) | : Ken Saito | |

It is certified that error appears in the above-identified patent and that said Letters Patent is hereby corrected as shown below:

In the Claims

Claim 1:
Column 14, Line 35: Delete "request" insert -- request; -- therefor.

Claim 8:
Column 17, Line 33: Delete "set" insert -- set; -- therefor.
Column 18, Line 35: Delete "transmits" and replace with -- transmit -- therefor.

Signed and Sealed this
Twenty-fourth Day of July, 2018

Andrei Iancu
*Director of the United States Patent and Trademark Office*